US012105652B2

(12) United States Patent
Leyendecker et al.

(10) Patent No.: US 12,105,652 B2
(45) Date of Patent: Oct. 1, 2024

(54) VALIDATION OF COMPONENT PLACEMENT IN AN INFORMATION HANDLING SYSTEM

(71) Applicant: Dell Products L.P., Round Rock, TX (US)

(72) Inventors: Robert R. Leyendecker, Round Rock, TX (US); Jun Gu, Austin, TX (US); Chien-Lin Lee, Round Rock, TX (US); Jon Vernon Franklin, Pflugerville, TX (US)

(73) Assignee: Dell Products L.P., Round Rock, TX (US)

(*) Notice: Subject to any disclaimer, the term of this patent is extended or adjusted under 35 U.S.C. 154(b) by 51 days.

(21) Appl. No.: 17/731,097

(22) Filed: Apr. 27, 2022

(65) Prior Publication Data

US 2023/0350823 A1 Nov. 2, 2023

(51) Int. Cl.
*G06F 13/20* (2006.01)

(52) U.S. Cl.
CPC ...... *G06F 13/20* (2013.01); *G06F 2213/0016* (2013.01); *G06F 2213/0026* (2013.01)

(58) Field of Classification Search
CPC ........................................ G06F 12/20
USPC .................................. 713/301–304
See application file for complete search history.

(56) References Cited

U.S. PATENT DOCUMENTS

| | | | | |
|---|---|---|---|---|
| 5,221,892 A * | 6/1993 | Sullivan | ........... | H01F 30/10 336/182 |
| 5,568,610 A * | 10/1996 | Brown | ........... | G06F 13/4072 714/48 |
| 5,644,734 A * | 7/1997 | Hong | ........... | G06F 13/4217 710/305 |
| 5,721,458 A * | 2/1998 | Kearney | ........... | G08C 19/00 713/340 |
| 5,758,100 A * | 5/1998 | Odisho | ........... | G06F 1/189 713/340 |
| 5,781,798 A * | 7/1998 | Beatty | ........... | G06F 9/4411 710/10 |
| 5,889,965 A * | 3/1999 | Wallach | ........... | G06F 13/4027 710/72 |
| 6,072,726 A * | 6/2000 | Hwang | ........... | G11C 16/102 713/1 |
| 6,243,774 B1 * | 6/2001 | Eide | ........... | G06F 9/4411 713/1 |
| 6,477,603 B1 * | 11/2002 | Locker | ........... | G06F 13/409 439/74 |

(Continued)

OTHER PUBLICATIONS

The I2C-Bus Specification Version 2. Jan. 1, 2000 (Year: 2000).*

*Primary Examiner* — Paul R. Myers
(74) *Attorney, Agent, or Firm* — Jackson Walker L.L.P.

(57) ABSTRACT

An information handling system may include a management controller and a chassis having mounted therein at least one add-in card. The management controller may be configured to: retrieve connection information from the add-in card, the connection information indicating a physical location of the add-in card within the chassis; compare the connection information with expected connection information associated with the information handling system; determine that the physical location of the add-in card within the chassis is in conflict with a restriction associated with the add-in card; and transmit an error message based on the determining.

12 Claims, 2 Drawing Sheets

(56) References Cited

U.S. PATENT DOCUMENTS

| | | | | |
|---|---|---|---|---|
| 6,904,531 B2* | 6/2005 | Huang | G06F 1/3287 | 713/340 |
| 6,961,785 B1* | 11/2005 | Arndt | G06F 13/12 | 713/1 |
| 7,522,614 B1* | 4/2009 | Aguinaga | H04L 12/46 | 370/401 |
| 8,693,596 B1* | 4/2014 | Warner | H04L 7/0062 | 713/400 |
| 9,489,210 B2* | 11/2016 | Eide | G06F 9/45558 | |
| 2002/0042845 A1* | 4/2002 | Burmann | H04L 12/66 | 709/250 |
| 2002/0194413 A1* | 12/2002 | Seto | G06F 13/4081 | 710/302 |
| 2003/0061324 A1* | 3/2003 | Atherton | G06F 11/3409 | 714/E11.201 |
| 2005/0117773 A1* | 6/2005 | Kobayashi | G06F 9/4411 | 382/100 |
| 2006/0095647 A1* | 5/2006 | Battaglia | G11C 16/20 | 710/13 |
| 2006/0136645 A1* | 6/2006 | Merkin | G06F 13/4081 | 710/302 |
| 2007/0038732 A1* | 2/2007 | Chandwani | H04L 41/24 | 714/E11.207 |
| 2007/0291304 A1* | 12/2007 | Takahashi | G06F 3/1288 | 358/1.15 |
| 2008/0065798 A1* | 3/2008 | Lu | G06F 9/4411 | 710/301 |
| 2012/0191884 A1* | 7/2012 | Brownlow | G06F 13/385 | 710/64 |
| 2012/0297379 A1* | 11/2012 | Anderson | G06F 9/45558 | 718/1 |
| 2015/0015213 A1* | 1/2015 | Brooks | B60L 53/63 | 320/137 |
| 2015/0058213 A1* | 2/2015 | Lee Kim-Koon | G06Q 20/3278 | 705/41 |
| 2015/0186323 A1* | 7/2015 | Kotta | G06F 9/45533 | 710/302 |
| 2015/0347345 A1* | 12/2015 | Hellriegel | G06F 13/409 | 710/301 |

\* cited by examiner

VALIDATION OF COMPONENT PLACEMENT IN AN INFORMATION HANDLING SYSTEM

TECHNICAL FIELD

The present disclosure relates in general to information handling systems, and more particularly to validation of the placement of components.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling resources (e.g., card-based resources such as Peripheral Component Interconnect Express (PCIe) add-in cards may have requirements that limit where they can be placed within an information handling system chassis. For example, based on power and/or thermal requirements, it may be the case that a component can be placed only in certain slots and not in other slots. Embodiments of this disclosure may apply to SmartNICs, data processing units (DPUs), infrastructure processing units (IPUs), and in general any type of resource that has one or more requirements that restrict where it should be placed within an information handling system.

In some cases, an add-in card may be connected to a PCIe riser assembly. For example, one type of riser assembly includes one or more floating card electromechanical (CEM) PCIe slots soldered to a fixed mezzanine riser or connected to a planar board (e.g., a motherboard) via a slimline (SL) cable connection. Only specific slots of such an assembly may be capable of using a separate power cable to provide a power source (e.g., an alternating current (AC) or direct current (DC) power source), which certain types of add-in cards may need.

Some embodiments are applicable in situations where an add-in card needs power during low-power states. For example, in the S5 state, auxiliary power is supplied to certain information handling resources, but not others. Further, certain types of resources, referred to as "high-aux" resources, may require more auxiliary power than is typically provided (e.g., 12 volts instead of 3.3s volts of auxiliary power, and/or requiring specified amounts of electrical current to be available).

Accordingly, techniques are needed to ensure that manufacturers, field service technicians, and customers install such an add-in card into the proper riser slot (s). If an add-in card is connected to the wrong riser slot (or if any other cabling or connection errors are present), then embodiments may generate an alert, log an error, and/or give the user options for how to proceed. For example, the user may decide to stop the system from booting to the operating system (OS), disable the add-in card, etc.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with information handling resource placement in information handling systems may be reduced or eliminated.

In accordance with embodiments of the present disclosure, an information handling system may include a management controller and a chassis having mounted therein at least one add-in card. The management controller may be configured to: retrieve connection information from the add-in card, the connection information indicating a physical location of the add-in card within the chassis; compare the connection information with expected connection information associated with the information handling system; determine that the physical location of the add-in card within the chassis is in conflict with a restriction associated with the add-in card; and transmit an error message based on the determining.

In accordance with these and other embodiments of the present disclosure, a method may include a management controller retrieving connection information from an add-in card of an information handling system, the connection information indicating a physical location of the add-in card within a chassis of the information handling system; the management controller comparing the connection information with expected connection information associated with the information handling system; the management controller determining that the physical location of the add-in card within the chassis is in conflict with a restriction associated with the add-in card; and the management controller transmitting an error message based on the determining.

In accordance with these and other embodiments of the present disclosure, an article of manufacture may include a non-transitory, computer-readable medium having computer-executable code thereon that is executable by a processor of a management controller of an information handling system for: retrieving connection information from an add-in card of an information handling system, the connection information indicating a physical location of the add-in card within a chassis of the information handling system; comparing the connection information with expected connection information associated with the information handling system; determining that the physical location of the add-in card within the chassis is in conflict with a restriction associated with the add-in card; and transmitting an error message based on the determining.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
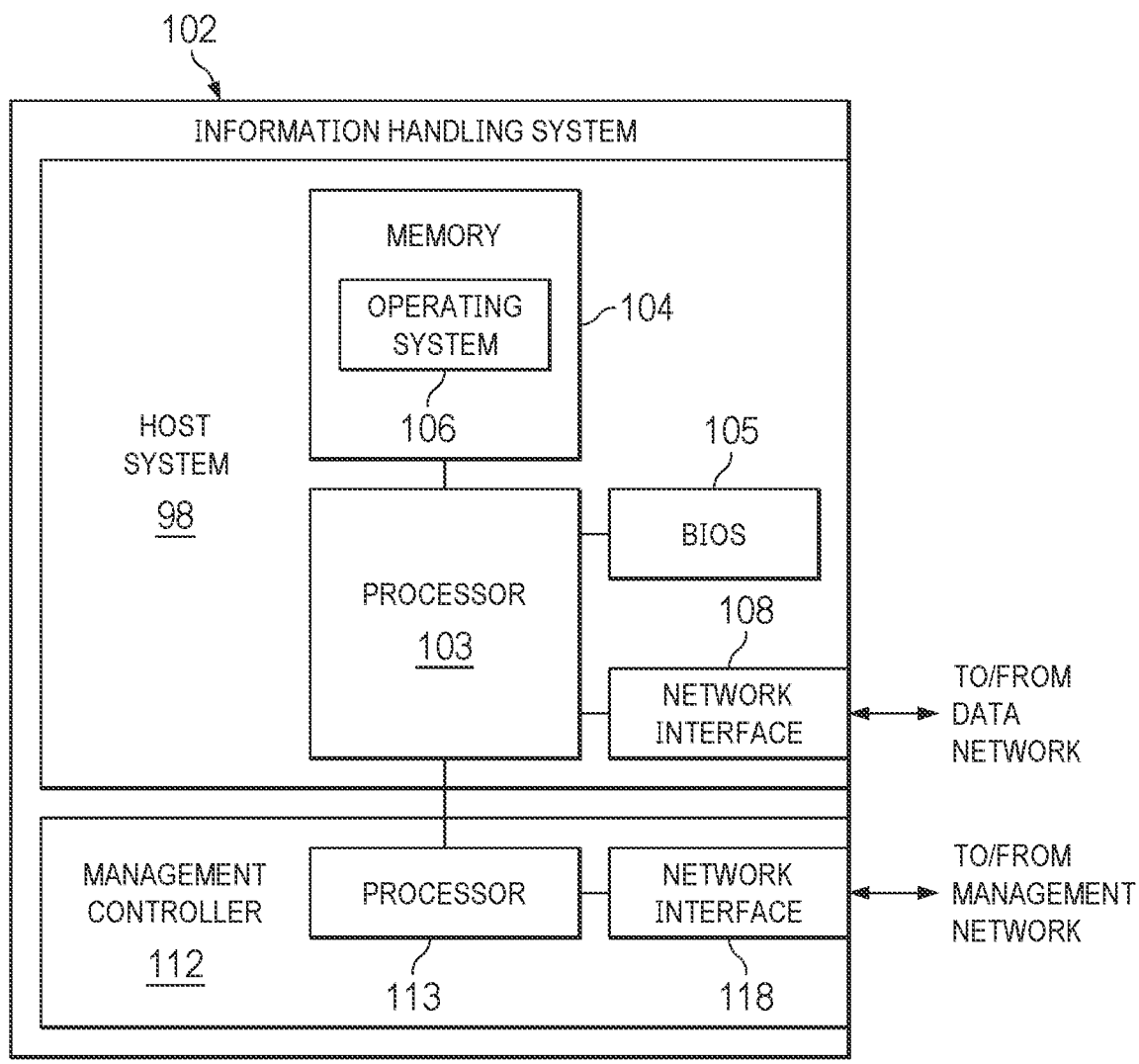
FIG. 1 illustrates a block diagram of an example information handling system, in accordance with embodiments of the present disclosure.
Figure 2:
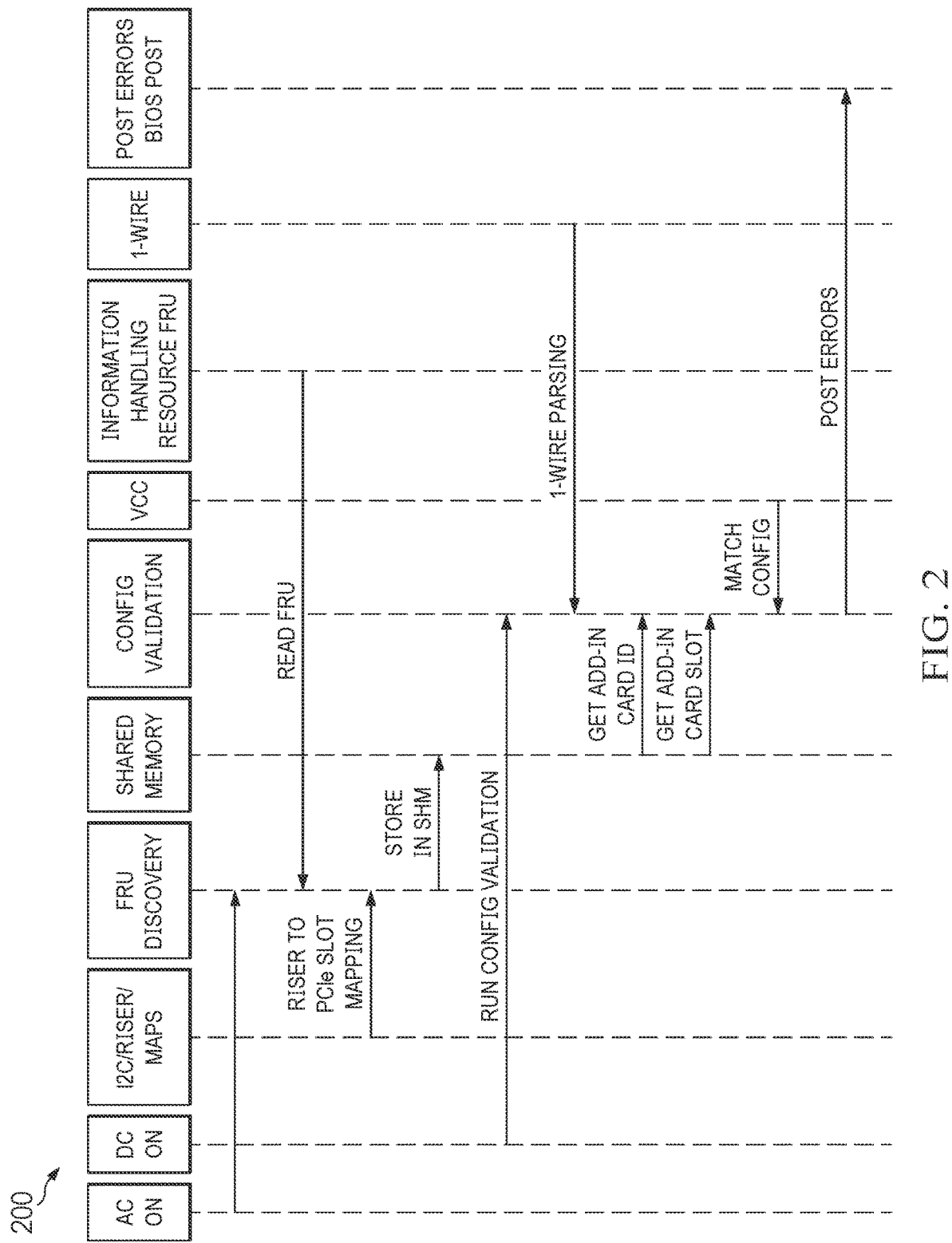
FIG. 2 illustrates an example method, in accordance with embodiments of the present disclosure.

Preferred embodiments and their advantages are best understood by reference to FIGS. 1 and 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives, solid-state drives, and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, certain information handling resources may have requirements (e.g., power and/or thermal requirements) that are met by particular slots of information handling system 102, but not by other slots.

Turning now to FIG. 2, a sequence diagram of a method 200 is shown, according to some embodiments. Method 200 depicts a method that may occur with respect to an information handling resource such as a PCIe add-in card when a system containing the resource is turned on. As shown, AC power may be first applied, and then DC power may be applied at a later time (e.g., once a power supply has come online and is able to supply auxiliary power, etc.).

In some embodiments, method 200 may take place before the host system of the information handling system has been powered on and/or before the host system has been booted (e.g., it may occur when a power button is first activated, but before the host system has been powered up). For example, the host system may be in a low-power state such as the S5 (AUX power) state or any other state. Power may nevertheless be supplied to certain components (e.g., the management controller, auxiliary power for certain add-in cards, etc.) as shown. In other embodiments, method 200 may take place during a pre-boot initialization phase of the host system. In yet other embodiments, method 200 may take place during normal operation of the host system.

The information handling resource may be coupled to a management controller of the information handling system via an Inter-Integrated Circuit ($I^2C$) bus, which may be embedded in the PCIe connection in some embodiments. In this implementation, the resource includes a field replaceable unit (FRU) which is generally implemented with a programmable circuit that includes basic identifying information about the resource, and which is readable by the management controller over the $I^2C$ bus.

As shown, when AC power is applied to the system, and shortly after the management controller of the system is booted, the FRU of the resource is discovered, and data from the FRU is parsed by a FRU discovery module of the management controller. The FRU data may then be stored in shared memory (also referred to herein as "SHM") that is accessible from multiple components of the information handling system. Based on the FRU data, the FRU discovery module may identify the add-in card type (e.g., SmartNIC type, DPU type, storage controller type, or any other card type). The FRU discovery module (as well as the other modules discussed herein) may be implemented via hardware, software, and/or firmware in particular implementations.

The FRU discovery module may also determine, based on a PCIe slot mapping, which PCIe slot the card resides in. The PCIe slot mapping data may be based on $I^2C$ slot mapping data files for each add-in card, and it may also be written to the shared memory.

Shortly after DC power-on, a configuration validation module of the management controller may read riser metadata, which may include data regarding cable and card edge connections, slot attributes, power attributes, etc. The riser metadata may be read from a complex programmable logic device (CPLD) embedded in the riser, and it may be accessed via a communication bus such as a 1-Wire bus. Power attributes may include information regarding which mainboard power cable is connected and whether it can be enabled.

The configuration validation module may also read the data that has been stored in shared memory to find add-in cards and their associated slot numbers.

A validation configuration check (VCC) table, discussed in more detail below, may also be read. The current configuration as it was detected in the previous steps may be correlated and matched to an entry for a particular system that is represented in the VCC table. This match is checked for add-in card entries, and the configuration validation module may determine that the detected configuration is assembled correctly.

At this point, if the system is assembled correctly, the host may proceed to boot. If not, the user may be alerted to the assembly error and given the option to continue or not, an error may be logged, etc.

One of ordinary skill in the art with the benefit of this disclosure will understand that the preferred initialization point for the method depicted in FIG. 2 and the order of the steps comprising that method may depend on the implementation chosen. In these and other embodiments, this method may be implemented as hardware, firmware, software, applications, functions, libraries, or other instructions. Further, although FIG. 2 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

As mentioned above, one embodiment of this disclosure is applicable to "high-aux" cards that consume a large amount of power during auxiliary power states such as S5. For these high-aux cards, the configuration validation module may detect when a required power cable (e.g., a riser power cable referred to as "Pout to Riser") is connected incorrectly or missing. In addition, there may be thermal implications dictating that a high-aux card can only be inserted in specific slots.

Embodiments may provide several features that are usable to implement various aspects of this disclosure. In one implementation, an add-in card discovery feature, a riser discover feature, and a configuration validation feature are used. These three features are discussed in more detail below.

The add-in card discovery feature may rely on the availability of a FRU device on each PCIe add-in card that is populated and accessible via I$^2$C. The FRU payload may indicate whether the add-in card is a high-aux card. The I$^2$C bus where the add-in FRU is found may be directly correlated to the user-facing PCIe slot number. The I$^2$C bus to PCIe slot mapping may be maintained in an I$^2$C bus to PCIe slot table, which may reside at the management controller in some embodiments. Accordingly, after device discovery, the associated PCIe slot number of the card is known and can be used to determine if the card is inserted in the proper slot based on data read from the VCC table.

The riser discovery feature may be used to determine information about any risers that are coupled to the system. The configuration validation module of the management controller may review the 1-Wire communication payloads of any riser CPLD devices in order to discover all attached devices (including the risers themselves). In one embodiment, the payload may include a bitfield that indicates (among other things) which Pout power connector is connected to the riser. The association between the FRU, the I$^2$C bus number, and the PCIe slot may be contained in a mapping file.

Finally, the configuration validation module may use the VCC table as mentioned above. In general, the VCC table may be implemented as any suitable data structure, and it may include various information about possible configuration states for the information handling system. For example, the VCC table may include information such as the platform name for the information handling system, a planar ID for the system's planar, riser IDs for any risers in use, a configuration ID for the specific configuration, element names for various information handling resources, connector types, power cable connections, and other parameters.

After add-in card discovery and riser discovery, the configuration validation module may collect all current configuration details, which may include riser slot numbers and capabilities. The configuration validation module may then compare the configuration with the VCC table, which lists all valid configurations for the platform, allowing the module to validate the current configuration. In particular, the VCC table may include one or more expected PCIe slot numbers for each specified add-in card. For every possible configuration of the platform, the VCC table may specify each riser connected directly to the planar along with its power requirements. Thus any mismatches between the actual configuration and the information in the VCC table may be identified as configuration errors.

In some situations, the current configuration of a system may not be a perfect match for any entry in the VCC table. In such an event, various heuristics may be applied in order to determine the "best" match within the VCC table. For example, a VCC table entry having the fewest number of deviations from the current configuration may be selected in some embodiments.

Table 1 below shows examples of mismatches that may be detected by comparing the actual configuration of a system with entries from the VCC table. In this table, bracketed entries indicate errors, NC indicates "not connected," and DC indicates "don't care."

TABLE 1

| Scenario | VCC data | | | Actual configuration | | | Expected Errors | Comments |
|---|---|---|---|---|---|---|---|---|
| | Riser connector | PCIe slot | Pout ID | Riser connector | PCIe slot | Pout ID | | |
| VCC and actual configuration match | 1 | 2 | 1 | 1 | 2 | 1 | None | No error |
| VCC and actual configuration match, but riser ID mismatch | 1 | 2 | 1 | 1 | 2 | 1 | None | Riser ID mismatch logged |
| DPU connected in wrong riser connector | [1] | 2 | 1 | 2 | DC | DC | Config error: add-in card in riser 2 | |
| DPU connected in wrong PCIe slot (riser ID matches) | 1 | [2] | 1 | 1 | [1] | DC | Config error: add-in card in riser 1 and slot 2 | |

TABLE 1-continued

|  | VCC data | | | Actual configuration | | | | |
| --- | --- | --- | --- | --- | --- | --- | --- | --- |
| Scenario | Riser connector | PCIe slot | Pout ID | Riser connector | PCIe slot | Pout ID | Expected Errors | Comments |
| DPU connected in wrong PCIe slot (riser ID mismatch) | 1 | [2] | 1 | 1 | [1] | DC | Config error: add-in card in riser 1 and slot 2 | Riser ID error logged |
| Pout not connected (riser ID matches) | 1 | 2 | [1] | 1 | 2 | [NC] | Config missing: sig pwr 1 | |
| Pout not connected (riser ID mismatch) | 1 | 2 | [1] | 1 | 2 | [NC] | Config missing: sig pwr 1 | Riser ID error logged |
| Pout connected in different slot (riser ID matches) | 1 | 2 | [1] | 1 | 2 | [2] | Config error: sig pwr 2 | |
| Pout connected in different slot (riser ID mismatch) | 1 | 2 | [1] | 1 | 2 | [2] | Config error: sig pwr 2 | Riser ID error logged |
| DPU missing | 1 | 2 | 1 | [NC] | [NC] | [NC] | Config missing: DPU add-in card | No error logged if DPU is optional |
| Unexpected DPU connected as extra | NC | NC | NC | [1] | [2] | [1] | Config error: DPU add-in card | |

This implementation may provide many benefits in terms of system manufacturing, field service, and administrator management via the management controller. For example, embodiments may be able to determine that a riser slot has a high-aux card installed. If the slot is not capable of supporting a high-aux card, this error may be detected.

Further, embodiments may be able to determine that a card requires an auxiliary power cable to energize the card during certain power states. If the power cable is absent or is not connected correctly, this error may be detected.

Further, embodiments may be able to determine that the proper riser is being used to connect the high-aux card. If the intended riser is not connected to the information handling system correctly, this error may be detected.

Further, embodiments may be able to determine that a slot contains an add-in card capable of power control at auxiliary power time, which may be used for management controller management purposes.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
a management controller; and
a chassis having mounted therein at least one add-in card;
wherein the management controller is configured to:
retrieve connection information from the add-in card, the connection information indicating a physical location of the add-in card within the chassis, wherein the connection information is retrieved from a field-replaceable unit (FRU) of the add-in card;

compare the connection information with expected connection information associated with the information handling system;

determine that the physical location of the add-in card within the chassis is in conflict with a restriction associated with the add-in card, wherein the restriction associated with the add-in card relates to a cooling requirement and/or a power requirement of the add-in card; and transmit an error message based on the determining.

2. The information handling system of claim 1, wherein the connection information is retrieved via an Inter-Integrated Circuit ($I^2C$) bus.

3. The information handling system of claim 1, wherein the add-in card is a Peripheral Component Interconnect Express (PCIe) card.

4. The information handling system of claim 1, wherein the management controller is further configured to retrieve riser connection information from a riser physically coupled to the add-in card, the riser connection information indicating physical connectivity of the riser with the add-in card.

5. A method comprising:

a management controller retrieving connection information from an add-in card of an information handling system, the connection information indicating a physical location of the add-in card within a chassis of the information handling system, wherein the connection information is retrieved from a field-replaceable unit (FRU) of the add-in card;

the management controller comparing the connection information with expected connection information associated with the information handling system;

the management controller determining that the physical location of the add-in card within the chassis is in conflict with a restriction associated with the add-in card, wherein the restriction associated with the add-in card relates to a cooling requirement and/or a power requirement of the add-in card; and the management controller transmitting an error message based on the determining.

6. The method of claim 5, wherein the connection information is retrieved via an Inter-Integrated Circuit ($I^2C$) bus.

7. The method of claim 5, wherein the add-in card is a Peripheral Component Interconnect Express (PCIe) card.

8. The method of claim 5, further comprising the management controller retrieving riser connection information from a riser physically coupled to the add-in card, the riser connection information indicating physical connectivity of the riser with the add-in card.

9. An article of manufacture comprising a non-transitory, computer-readable medium having computer-executable code thereon that is executable by a processor of a management controller of an information handling system for:

retrieving connection information from an add-in card of an information handling system, the connection information indicating a physical location of the add-in card within a chassis of the information handling system, wherein the connection information is retrieved from a field-replaceable unit (FRU) of the add-in card;

comparing the connection information with expected connection information associated with the information handling system;

determining that the physical location of the add-in card within the chassis is in conflict with a restriction associated with the add-in card, wherein the restriction associated with the add-in card relates to a cooling requirement and/or a power requirement of the add-in card; and transmitting an error message based on the determining.

10. The article of claim 9, wherein the connection information is retrieved via an Inter-Integrated Circuit ($I^2C$) bus.

11. The article of claim 9, wherein the add-in card is a Peripheral Component Interconnect Express (PCIe) card.

12. The article of claim 9, wherein the instructions are further executable for:

retrieving riser connection information from a riser physically coupled to the add-in card, the riser connection information indicating physical connectivity of the riser with the add-in card.

* * * * *